US012794790B2

(12) United States Patent
Watkins et al.

(10) Patent No.: US 12,794,790 B2
(45) Date of Patent: Nov. 10, 2026

(54) MANAGING DIFFERENT ADDM APPLIANCES USING A CROSS-COMPATIBLE CENTRALIZED PLATFORM

(71) Applicant: MASTERCARD INTERNATIONAL INCORPORATED, Purchase, NY (US)

(72) Inventors: Tim M. Watkins, Tacoma, WA (US); Ian Middleton, Basingstoke (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 109 days.

(21) Appl. No.: 19/021,104

(22) Filed: Jan. 14, 2025

(65) Prior Publication Data

US 2026/0205385 A1 Jul. 16, 2026

(51) Int. Cl.
*H04L 41/045* (2022.01)
*H04L 41/50* (2022.01)

(52) U.S. Cl.
CPC ........ *H04L 41/5058* (2013.01); *H04L 41/045* (2022.05)

(58) Field of Classification Search
CPC .......................... H04L 41/5058; H04L 41/045
See application file for complete search history.

(56) References Cited

U.S. PATENT DOCUMENTS 11,089,115 B2 8/2021 Garty et al.
11,423,111 B2 8/2022 Vaishnavi
11,463,316 B2 10/2022 Sethi et al.
11,736,352 B2 8/2023 De Peuter et al.
2016/0239274 A1* 8/2016 Strachota .................. G06F 8/30
2019/0250898 A1* 8/2019 Yang .......................... G06F 8/65
2021/0014759 A1* 1/2021 Zhu ......................... G06F 9/546
2022/0057999 A1* 2/2022 Pitchai Muthu ........ G06F 21/51
(Continued)

OTHER PUBLICATIONS

Meng, et al., "A Generic Framework for Application Configuration Discovery with Pluggable Knowledge," In Proceedings of the 2013 IEEE Sixth International Conference on Cloud Computing, 2013, 8 pages.

*Primary Examiner* — Oleg Survillo
(74) *Attorney, Agent, or Firm* — Barta Jones, PLLC

(57) ABSTRACT

A computerized method manages a group of different Application Discovery and Dependency Mapping (ADDM) appliances using a single central manager entity. An operation that is associated with a first ADDM appliance and a second ADDM appliance is determined. A first sub-operation to be performed by the first ADDM appliance is identified and a second sub-operation to be performed by the second ADDM appliance is identified. A first message for the first ADDM appliance is determined from an ADDM appliance data store. A second message for the second ADDM appliance is determined from the ADDM appliance data store. The determined first message is sent to the first ADDM appliance using the first interface, whereby the first sub-operation is performed by the first ADDM appliance. The determined second message is sent to the second ADDM appliance using the second interface, whereby the second sub-operation is performed by the second ADDM appliance.

20 Claims, 5 Drawing Sheets

(56) References Cited

U.S. PATENT DOCUMENTS

| | | | | |
|---|---|---|---|---|
| 2023/0171155 | A1 | 6/2023 | Garty | |
| 2023/0385126 | A1 | 11/2023 | Thakkar et al. | |
| 2024/0114593 | A1* | 4/2024 | Sabeur | H04L 5/0048 |
| 2025/0310297 | A1* | 10/2025 | Doyle | H04L 61/5014 |

* cited by examiner

MANAGING DIFFERENT ADDM APPLIANCES USING A CROSS-COMPATIBLE CENTRALIZED PLATFORM

BACKGROUND

Configuration management scanning solutions often take the form of a 'virtual appliance' which scans and inventories information technology assets, devices, and software. When positioned in large and disjointed network configurations, these systems cannot communicate with each other directly in the form of a cluster. As a result, manual interaction and labor to support the ecosystem is expensive and does not scale.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing a group of different Application Discovery and Dependency Mapping (ADDM) appliances using a single central manager entity is described. An operation that is associated with a first ADDM appliance and a second ADDM appliance is determined to be performed. A first sub-operation of the determined operation to be performed by the first ADDM appliance is identified and a second sub-operation of the determined operation to be performed by the second ADDM appliance is identified. A first message to be sent to the first ADDM appliance is determined from a group of messages in an ADDM appliance data store, wherein the first message is compatible with a first interface of the first ADDM appliance and the first message is configured to cause the first sub-operation to be performed by the first ADDM appliance. A second message to be sent to the second ADDM appliance is determined from the group of messages in the ADDM appliance data store, wherein the second message is compatible with a second interface of the second ADDM appliance and the second message is configured to cause the second sub-operation to be performed by the second ADDM appliance. The determined first message is sent to the first ADDM appliance using the first interface, whereby the first sub-operation is performed by the first ADDM appliance. The determined second message is sent to the second ADDM appliance using the second interface, whereby the second sub-operation is performed by the second ADDM appliance.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Aspects of the disclosure provide systems and methods for managing a group of different Application Discovery and Dependency Mapping (ADDM) appliances using a single central manager entity. The described ADDM Enterprise Manager (AEM) determines operations to be performed, determines the ADDM appliances which are associated with the determined operations, and then determines instructions or other messages to be sent to those determined ADDM appliances to cause the determined operations to be performed. The AEM stores information about the group of ADDM appliances that enables the AEM to interact with the ADDM appliances using a variety of different exposed interfaces of those ADDM appliances. Through these interactions, the AEM is configured to monitor activities of the ADDM appliances, manage the configurations of the ADDM appliances (e.g., to address issues arising from configuration drift), and/or synchronizing credentials, settings, and/or other parameters across multiple ADDM appliances.

The disclosure operates in an unconventional manner at least by obtaining and storing the interface and message requirements for a wide variety of different types of ADDM appliances, such that the AEM is cross-compatible and/or interoperable with a variety of the associated ADDM appliances and operations of the AEM can be efficiently performed across those ADDM appliances. The AEM substantially reduces the need for manually performing operations separately across many different ADDM appliances to keep them synchronized. Further, resource consumption, such as data storage resource consumption and processing resource consumption, is reduced using the AEM when compared to other systems that use separate management solutions for the different types of ADDM appliances. By centralizing the control of many types of ADDM appliances, the described systems are further able to scale efficiently with the sizes of larger configuration management systems. Such scaling would be much more difficult in systems where separate solutions are used to interact with the various ADDM appliances.

Additionally, in some examples of the disclosure, the described AEM is configured to communicate with an ADDM appliance using both application programming interfaces (APIs) and command line interfaces (CLI), such that the AEM is capable of flexibly interacting with many different types of ADDM appliances, regardless of what kind of interfaces those appliances expose. This flexibility enables the described system to more efficiently use resources and time during operations when compared to other systems that must use different solutions for communication via APIs and CLIs.

Figure 1:
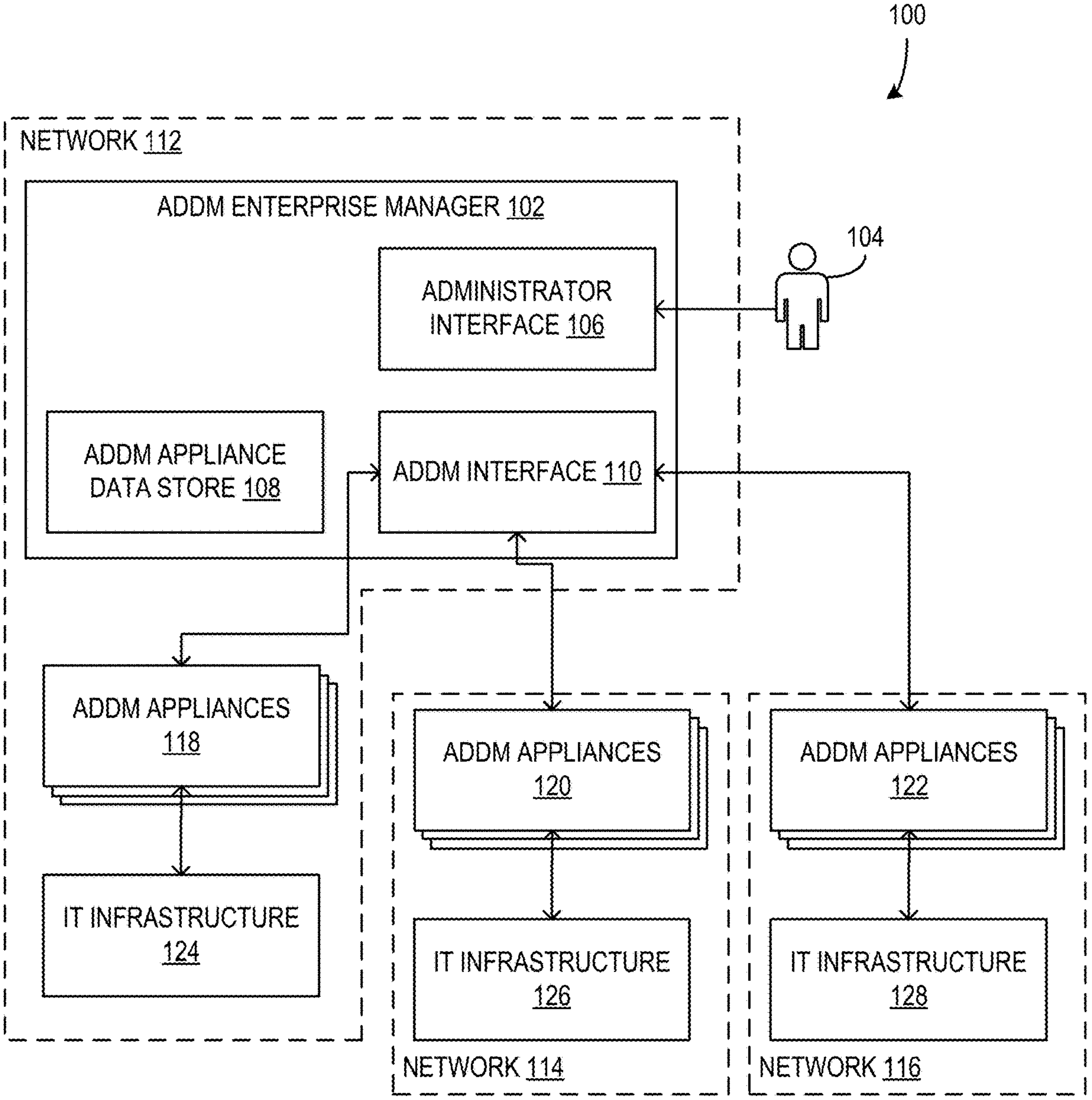
FIG. 1 is a block diagram illustrating an example system configured for using an Application Discovery and Dependency Mapping (ADDM) Enterprise Manager (AEM) to manage a variety of types of ADDM appliances distributed across several networks.

FIG. 1 is a block diagram illustrating an example system 100 configured for using an Application Discovery and Dependency Mapping (ADDM) Enterprise Manager (AEM) 102 to manage a variety of types of ADDM appliances 118, 120, and/or 122 distributed across several networks 112, 114, and/or 116. In some examples, an administrator 104 accesses the AEM 102 via an administrator interface 106 and provides instructions to the AEM 102. The AEM 102 carries out the instructions through interactions with the ADDM appliances 118-122 via an ADDM interface 110. The AEM 102 uses interface definitions of the ADDM appliances 118-122 stored in the ADDM appliance data store 108, such that the AEM 102 is configured to interact with a wide variety of ADDM appliances using the interface definitions associated therewith. In some such examples, the interface definitions include definitions defining how to use application programming interfaces (APIs) exposed by the ADDM appliances 118-122 and/or definitions defining how to use Secure Shell (SSH) protocol interfaces exposed by the ADDM appliances 118-122. Through the interactions with the ADDM appliances 118-122, the AEM 102 observes the operations thereof, manages the operations thereof, and/or causes the ADDM appliances 118-122 to gather inventory from and/or control the Information Technology (IT) infrastructure 124, 126, and/or 128 associated therewith, as described herein.

Further, in some examples, the system 100 includes one or more computing devices (e.g., the computing apparatus of FIG. 5) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the AEM 102 is executed on a first computing device and the ADDM appliances 118 are located on one or more other computing devices within the system 100. The first computing device and one or more other computing devices are configured to communicate with each other via network connections. Alternatively, in some examples, other components of the AEM 102 (e.g., the administrator interface 106 and the ADDM appliance data store 108) are executed on separate computing devices and those separate computing devices are configured to communicate with each other via network connections during the operation of the AEM 102. In other examples, other organizations of computing devices are used to implement system 100 without departing from the description.

In some examples, the AEM 102 is configured to interact with the ADDM appliances 118-122 based on instructions received from an administrator 104 and/or automatically based on the configuration of the AEM 102. For instance, in some such examples, the AEM 102 is configured to use API and/or SSH interfaces provided by an ADDM appliance 118 to scan the inventory of IT infrastructure 124 that is associated with the ADDM appliance 118, thus enabling the AEM 102 to discover IT assets, devices, and/or software that is otherwise monitored and/or managed by the ADDM appliance 118. In many systems that include large and/or disjointed network configurations, the various ADDM appliances 118 cannot communicate with each other directly in the form of a cluster. As a result, manual interaction and/or labor is required to support the ADDM appliances of the systems. The AEM 102 as described herein enables those ADDM appliances to be managed from the single AEM 102, eliminating and/or otherwise reducing the manual efforts required to manage each ADDM appliance separately, through automation functions and scheduled batch activities with execution on/to the ADDM Appliances (118-122).

Further, in some examples, the administrator interface 106 includes a graphical user interface (GUI) that presents or displays information about the ADDM appliances 118-122 and associated operations being performed. For instance, in an example, the administrator 104 executes an operation on the AEM 102 that causes sub-operations to be performed on an ADDM appliance 118 and an ADDM appliance 120. The GUI of the administrator interface 106 displays an icon and/or text illustrating that the operation is currently being performed, thereby informing the administrator 104 of the status of the operation. When the operation is completed, the GUI of the administrator interface 106 is updated by automatically moving an icon and/or text associated with the operation from a portion of the GUI associated with pending operations to a portion of the GUI associated with completed operations, thereby informing the administrator 104 that the operation has been completed.

The ADDM appliances 118-122 include hardware, firmware, and/or software configured for discovering and mapping dependencies of various applications running on servers and/or network devices within the associated IT infrastructure 124-128. Mapping of such applications enables the structure of the IT infrastructure to be observed and/or analyzed as a comprehensive cluster of resources. As a result of such mapping, the various elements of the IT infrastructure can be leveraged more efficiently as a group.

Additionally, or alternatively, in some examples, the AEM 102 includes software (e.g., Python-based software) that is configured to manage the endpoints of the distributed ADDM appliance 118-122 via Representational State Transfer (REST) APIs, Command Line Interfaces (CLI), and/or SSH interfaces. The AEM 102 includes (e.g., stored in the ADDM appliance data store 108) definitions of those interfaces for each of the ADDM appliances 118-122, such that the AEM 102 has visibility and/or awareness of how to interact with each of the ADDM appliances 118-122, even if the methods of interacting are significantly different between the various ADDM appliances 118-122. For instance, in some examples, the AEM 102 is configured to connect to each ADDM appliance 118-122 (e.g., via REST API, SSH, and/or other CLI) to retrieve and collect vital configuration details, health information, and/or status information. Further, the AEM 102 is configured to control various activities of the ADDM appliances 118-122, including, but not limited to, monitoring and alerting on issues within the ADDM appliances 118-122, managing and/or synchronizing credentials across the ADDM appliances 118-122, administering various key configurations (e.g., platform scripts from code repository, etc.), scheduling activities across one or more of the ADDM appliances 118-122 (e.g., managing schedulers of the ADDM appliances 118-122 and/or performing batch functions that affect multiple ADDM appliances 118-122), managing upgrades, patching, and/or software release activities, and providing and managing integration with other $3^{rd}$ Party systems (e.g., SCCM, JAMF, vCenter, PCF, Ansible, Jenkins, Chef, etc.).

In some examples, the AEM 102 is configured to interact with the ADDM appliances 118-122 without requiring or using agents (e.g., programs that must be running on the ADDM appliances 118-122 themselves). As described herein, the agentless interface between the AEM 102 and the ADDM appliances 118-122 is achieved through the use of APIs, SSH interfaces, and/or other CLIs that are exposed or provided by the ADDM appliances 118-122 themselves.

Further, in some examples, the AEM 102 is configured to perform appliance monitoring activities, including health monitoring and status monitoring. The AEM 102 is configured to monitor aspects of an ADDM appliance 118-122 using the described interfaces by periodically communicating with the ADDM appliance or by interacting with the ADDM appliance based on the occurrence of an event. The AEM 102 is also configured to generate alerts based on the detection of issues with the ADDM appliance during the described monitoring. In some such examples, the alerts are provided to an administrator 104 and/or otherwise logged within the AEM 102 for review or analysis. Thus, administrators 104 are enabled to act to address the issue based on the alert. Additionally, or alternatively, the AEM 102 is configured to automatically take an action based on a detected issue, wherein the automated action is an action that addresses the issue in some way. For instance, in an example where any issue is detected with the network connectivity of an ADDM appliance 118, the AEM 102 is configured to automatically reset the network connection of the ADDM appliance 118 or otherwise address the detected network connectivity issue.

Additionally, or alternatively, in some examples, the AEM 102 is configured to manage the scheduling and/or timing of activities with respect to the ADDM appliances 118-122. For instance, in an example, the ADDM appliances 118-122 have scheduled downtimes that are staggered in such a way that only one or a few of the ADDM appliances 118-122 are down at any one time. The AEM 102 is configured to store the downtime schedule of the ADDM appliances 118-122 (e.g., in the ADDM appliance data store 108) and to send downtime instructions to each ADDM appliance 118-122 at the scheduled time for that ADDM appliance 118-122, using the defined interfaces of the ADDM appliance 118-122 to communicate the downtime instruction.

In some examples, the AEM 102 is configured to provide credential management for the discovered endpoints of the ADDM appliances 118-122. For instance, in an example, the AEM 102 orchestrates credential rotation and updates in order to synchronize credentials across all applicable ADDM appliances 118-122 and/or to manage the credentials in sync with an enterprise vault solution (e.g., HASHICORP, BEYONDTRUST, CENTRIFY, CYBERARK, etc.).

Further, in some examples, the AEM 102 is configured to perform network connectivity validation of the network stacks associated with the ADDM appliances 118-122. This network connectivity validation can be used in conjunction with the above-described issue detection and alerting system to enable administrators 104 act to cure issues and/or to enable the AEM 102 to automatically cure network issues.

Additionally, or alternatively, the AEM 102 is configured to perform software profile updates for the ADDM appliances 118-122. In some examples, a software profile library is received from an ADDM provider for an ADDM appliance 118 periodically and the AEM 102 is configured to receive the software profile library and to cause the ADDM appliance 118 to be updated using the received software profile library (e.g., the software profile library is implemented like a patch).

In some examples, the AEM 102 is configured to perform vulnerability management operations with respect to the ADDM appliances 118-122. For instance, in an example where a new vulnerability has been identified and a fix for the vulnerability has been received by the system 100, the AEM 102 is configured to apply the fix to any of the ADDM appliances 118-122 that are vulnerable to the new vulnerability using the defined interfaces of those vulnerable ADDM appliances 118-122 (e.g., appliance operating system patching and/or security hot fixes).

Further, the AEM 102 is configured to monitor and manage appliance configuration states of the ADDM appliances 118-122, including automated monitoring of the inventories and/or statuses of those appliances. Additionally, in some examples, the AEM 102 manages documentation updates to external documentation/knowledge systems which are associated with the configuration states of the ADDM appliances 118-122 (e.g., ATLASSIAN's CONFLUENCE via API, Media Wiki, etc.).

Additionally, in some examples, the AEM 102 is configured to orchestrate and/or facilitate the use of an IT Service Management (ITSM) ticket system for use with automated change control of the ADDM appliances 118-122 and/or the AEM 102 itself, incident tracking, and/or other ticketing functions based on system activity. Further, the AEM 102 is configured to provide an Enterprise Self Service Portal with tightly controlled, but authorized activities such as rescanning specific ADDM appliance endpoints (e.g., refreshing the latest IT asset data of a select endpoint), generating reports by pulling data from some or all of the ADDM appliances 118-122 and normalizing the data for comparison purposes, and/or updating Enterprise Service Models to aggregate which IT assets comprise a given Business Service).

In some examples, the AEM 102 is configured to provide an Automated Service Model Verification Workflow to Enterprise Technology owners to re-certify the infrastructure in inventory against the known service definition for that technology. For instance, in an example, the AEM 102 interacts with an ADDM appliance 118 to scan the current IT infrastructure 124 associated with that ADDM appliance 118 and the results of the scan are compared to a stored service definition in order to complete a re-certification process.

Further, in some examples, the AEM 102 enables custom augmentation, plugins, and/or code release functionality. Additionally or alternatively, the AEM 102 is configured to manage code customization implementation with intake from the likes of GITFLOW technology (e.g., GITHUB, BITBUCKET, etc.) in the form of a Pull Request or otherwise, leveraging a webhook to monitor for such condition, then perform defined actions for package and bundling of the unique configurations to be applied to the ADDM appliances (118-122) as appropriate and then facilitates that Release work flow. This may also include again interaction with ITSM solutions for Change Request processing and automated implementation and release validation.

Additionally, or alternatively, the AEM 102 is configured to synchronize configurations of ADDM appliance clusters. In some examples, the ADDM appliances 118-122 include clusters of ADDM appliances that are redundant (e.g., a first cluster has the same or similar ADDM appliances and associated IT infrastructure 124-128 as a second cluster). Having redundant clusters enables the system 100 to reduce downtime and avoid issues where IT infrastructure is inaccessible due to issues in a first cluster of ADDM appliances. The AEM 102 is configured to determine a configuration for a first cluster and to perform operations on the ADDM appliances of a second cluster that is redundant or otherwise associated with the first cluster, whereby the configuration of the second cluster is synchronized to the determined configuration of the first cluster. Further, the synchronized configuration is maintained by the AEM 102, such that any configuration changes made to the first cluster are also made to the second cluster and vice versa.

It should be understood that, in some examples, the ADDM appliances 118-122 include one or more of the following technologies: BMC's DISCOVERY ADDM, DEVICE 42's IT ASSET MANAGEMENT, IBM's TIVOLI ADDM, SERVICE NOW's DISCOVERY ADDM, or other such ADDM solutions. Further, it should be understood that, in other examples, more, fewer, or different types of ADDM appliances are used in the system 100 without departing from the description.

Figure 2:
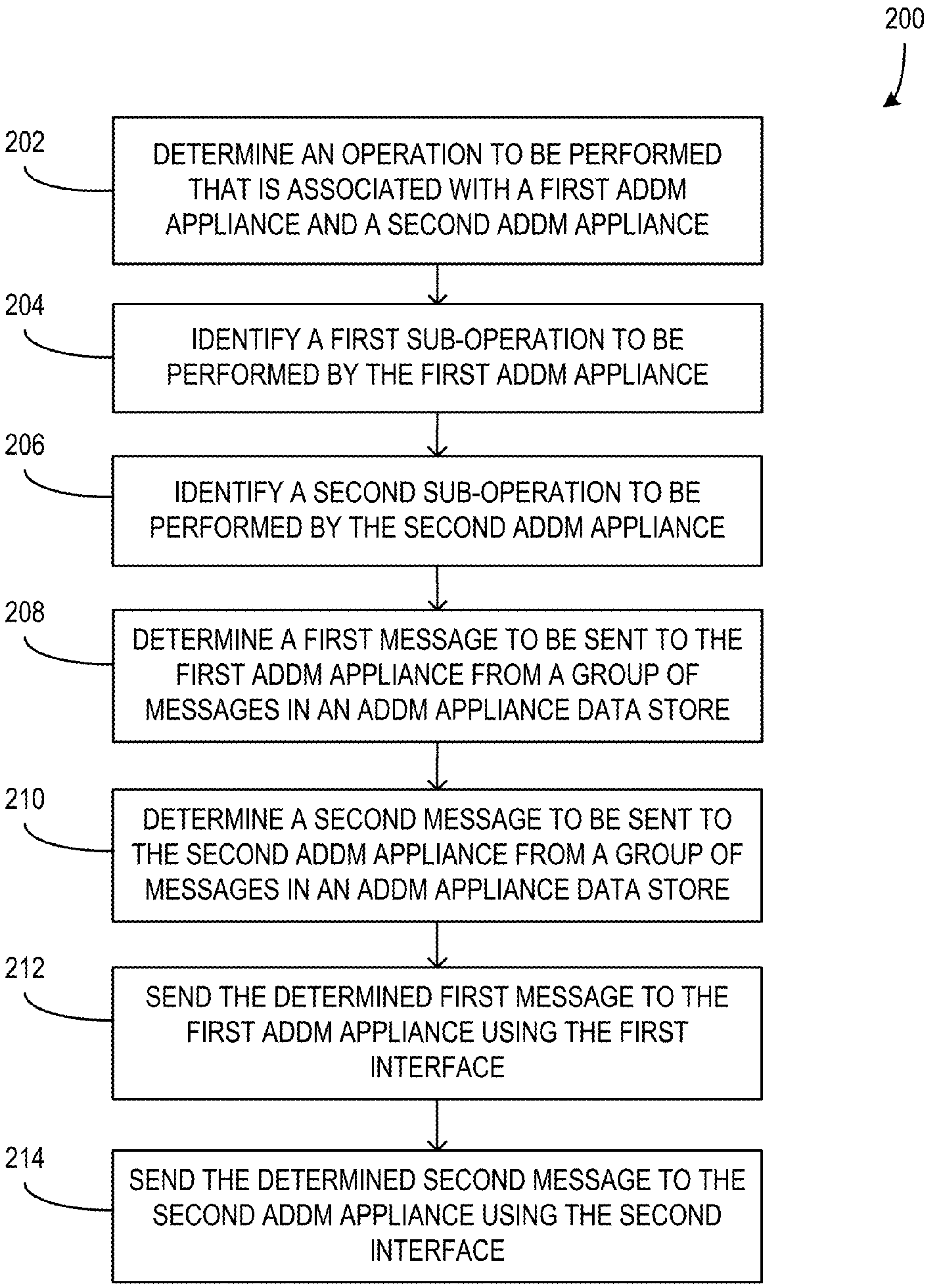
FIG. 2 is a flowchart illustrating an example method for managing multiple ADDM appliances using an AEM.

FIG. 2 is a flowchart illustrating an example method 200 for managing multiple ADDM appliances (e.g., ADDM appliances 118-122) using an AEM (e.g., AEM 102). In some examples, the method 200 is executed or otherwise performed in a system such as system 100 of FIG. 1.

At 202, an operation to be performed is determined, wherein the operation is determined to be associated with a first ADDM appliance and a second ADDM appliance. In some examples, the determined operation is completed by the performance of the sub-operations by each of the first and second ADDM appliances. In other examples, more or different sub-operations are performed by ADDM appliances during the performance of the determined operation without departing from the description.

At 204, a first sub-operation to be performed by the first ADDM appliance is identified, wherein the first sub-operation is part of the determined operation. In some examples, the first sub-operation includes the generation and/or retrieval of data for use in the performance of the determined operation. Alternatively, or additionally, the first sub-operation includes alteration of parameters, configuration, or other aspects of the first ADDM appliance and/or the IT infrastructure with which the first ADDM appliance is associated.

At 206, a second sub-operation to be performed by the second ADDM appliance is identified, wherein the second sub-operation is part of the determined operation. In some examples, the second sub-operation includes the generation and/or retrieval of data for use in the performance of the determined operation. Alternatively, or additionally, the second sub-operation includes alteration of parameters, configuration, or other aspects of the second ADDM appliance and/or the IT infrastructure with which the second ADDM appliance is associated.

At 208, a first message to be sent to the first ADDM appliance is determined from a group of messages in an ADDM appliance data store. In some examples, determining the first message includes determining a first interface of the first ADDM appliance via which the first message is to be sent. Further, in some examples, the first message is determined through the use of an operation-message map as described below with respect to FIG. 4. For instance, in an example, an identifier of the first sub-operation is used to identify an index of the operation-message map and, using the identified index, the first message to be sent to the first ADDM appliance is determined. It should be understood that, in other examples, the first sub-operation leads to the determination of more and/or different messages to be sent to the first ADDM appliance without departing from the description.

At 210, a second message to be sent to the second ADDM appliance is determined from the group of messages in the ADDM appliance data store. In some examples, determining the second message includes determining a second interface of the second ADDM appliance via which the second message is to be sent. Further, in some examples, the second message is determined through the use of an operation-message map as described below with respect to FIG. 4. For instance, in an example, an identifier of the second sub-operation is used to identify an index of the operation-message map and, using the identified index, the second message to be sent to the second ADDM appliance is determined. It should be understood that, in other examples, the second sub-operation leads to the determination of more and/or different messages to be sent to the second ADDM appliance without departing from the description.

At 212, the determined first message is sent to the first ADDM appliance using the first interface. The first message causes the first ADDM appliance to perform the first sub-operation of the determined operation.

At 214, the determined second message is sent to the second ADDM appliance using the second interface. The second message causes the second ADDM appliance to perform the second sub-operation of the determined operation.

In some examples, sending the first message to the first ADDM appliance using the first interface includes forming an intra-network connection (e.g., a network connection between the source of the message and the first ADDM appliance within the same network) over a first network with the first ADDM appliance over which the determined first message is sent. Additionally, or alternatively, in some such examples, sending the second message to the second ADDM appliance using the second interface includes forming a network connection to a second network on which the second ADDM appliance is deployed, wherein the second message is sent over the network connection to the second network. It should be understood that, in other examples, other arrangements of network connections are used to communicate with the first and second ADDM appliances without departing from the description.

Further, in some examples, the first interface is an API, and the second interface is a CLI. In other examples, the first and second interfaces are different types of interfaces without departing from the description.

Additionally, or alternatively, the determined operation is an operation for updating account credentials on the first ADDM appliance and the second ADDM appliance. The determined first message includes instructions to the first ADDM appliance to update account credentials as defined in the determined operation and the second message includes instructions to the second ADDM appliance to update account credentials as defined by the determined operation, such that the updated account credentials on the first ADDM appliance and the second ADDM appliance match.

In some examples, the determined operation is an operation for synchronizing a first configuration of the first ADDM appliance and a second configuration of the second ADDM appliance. The determined first message includes a request for configuration information of the first configuration of the first ADDM appliance and the determined second message includes instructions to the second ADDM appliance to update the second configuration of the second ADDM appliance using the configuration information of the first configuration of the first ADDM appliance. In some such cases, the synchronizing of configurations between ADDM appliances can be used to efficiently address issues caused by configuration drift, which can result in small configuration deviations over time.

Further, in some examples, the determined operation is an operation for addressing an issue associated with a first IT infrastructure entity of the first ADDM appliance. The first message includes an instruction to the first ADDM appliance to reset the first IT infrastructure entity and the second message includes an instruction to the second ADDM appliance to reconfigure a second IT infrastructure entity to replace the first IT infrastructure entity during downtime of the first IT infrastructure entity. Additionally, or alternatively, AEM 102 may send operations to update or replace the entire ADDM Appliance(s) 118-122 through interactive API deployment instructions to a Virtualization Platform Management Solution (e.g., VMWARE, VCENTER, VSPHERE, etc.) such that the entire virtual appliance is replaced or updated.

Figure 3:
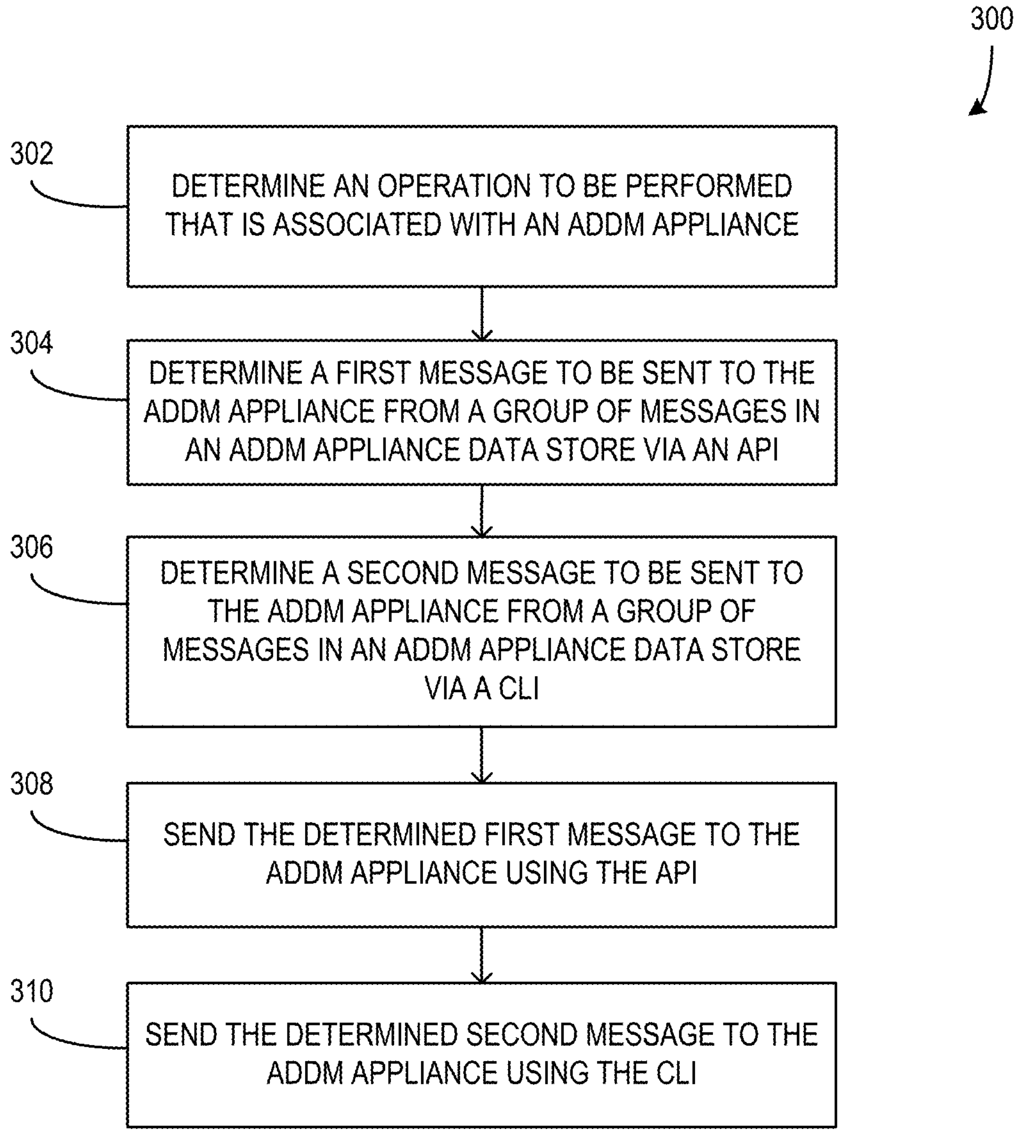
FIG. 3 is a flowchart illustrating an example method for managing an ADDM appliance using an AEM.

FIG. 3 is a flowchart illustrating an example method 300 for managing an ADDM appliance (e.g., ADDM appliances 118-122) using an AEM (e.g., AEM 102). In some examples, the method 300 is executed or otherwise performed in a system such as system 100 of FIG. 1.

At 302, an operation to be performed is determined, wherein the operation is associated with an ADDM appliance. In some examples, the operation is associated with more ADDM appliances without departing from the description.

At 304, a first message to be sent to the ADDM appliance via an API is determined from a group of messages in an ADDM appliance data store. The first message is configured to cause a first sub-operation of the determined operation to be performed by the ADDM appliance.

At 306, a second message to be sent to the ADDM appliance via a CLI is determined from the group of messages in the ADDM appliance data store. The second message is configured to cause a second sub-operation of the determined operation to be performed by the ADDM appliance. In some examples, the determined operation is completed by performing the first and second sub-operations. Alternatively, or additionally, in some examples, the determined operation requires other sub-operations to be performed without departing from the description.

At 308, the determined first message is sent to the ADDM appliance using the API. The first message causes the ADDM appliance to perform the first sub-operation of the determined operation.

At 310, the determined second message is sent to the ADDM appliance using the CLI. (The interaction is most often in the form of SSH or PowerShell between AEM 102 and ADDM Appliances 118-122) The second message causes the ADDM appliance to perform the second sub-operation of the determined operation.

In some examples, the determined operation is an operation for updating account credentials on the ADDM appliance. The determined first message includes instructions to the ADDM appliance to update a first portion of account credentials as defined by the determined operation and the second message includes instructions to the ADDM appliance to update a second portion of account credentials as defined by the determined operation.

Further, in some examples, the determined operation is an operation for synchronizing a first configuration of the ADDM appliance with a second configuration of another ADDM appliance, wherein the determined first message includes instructions to update a first portion of the first configuration of the ADDM appliance using the second configuration and the determined second message includes instructions to the ADDM appliance to update a second portion of the first configuration of the ADDM appliance using the second configuration. After the determined operation is performed, the first configuration of the ADDM appliance is the same as or otherwise synchronized with the second configuration of the other ADDM appliance.

Alternatively, in some examples, the determined operation is an operation for addressing an issue associated with a first IT infrastructure entity of the ADDM appliance. The determined first message includes an instruction the ADDM appliance to reset the first IT infrastructure entity and the second message includes an instruction to the ADDM appliance to reroute traffic associated with the first IT infrastructure entity to a second IT infrastructure entity.

Figure 4:
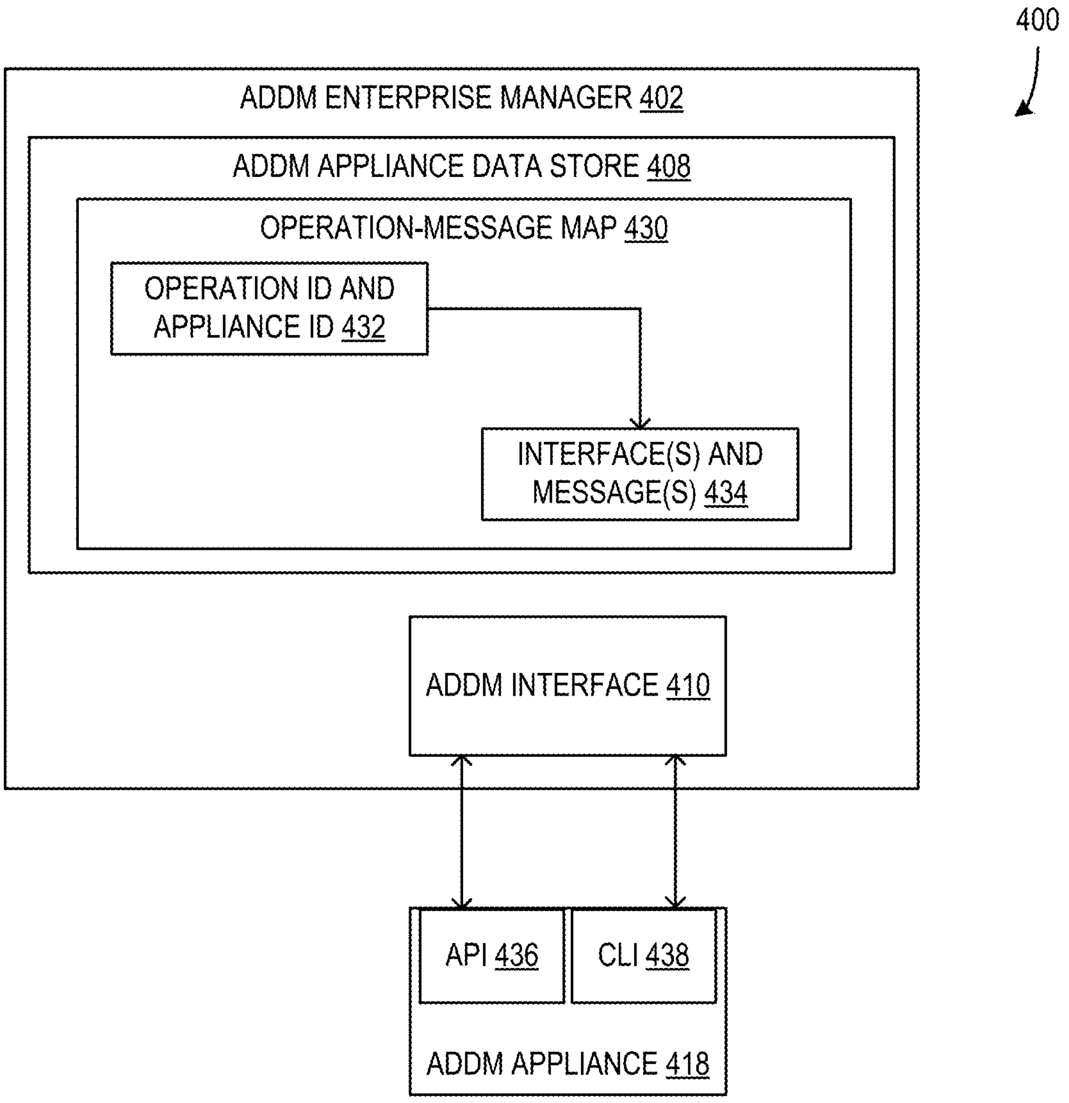
FIG. 4 is a diagram illustrating an example system configured to store ADDM appliance interfaces and associated messages in an operation-message map and use those stored interfaces and messages to interact with an associated ADDM appliance.

FIG. 4 is a diagram illustrating an example system 400 configured to store ADDM appliance interfaces and associated messages 434 in an operation-message map 430 and use those stored interfaces and messages 434 to interact with an associated ADDM appliance 418. In some examples, the system 400 is part of or otherwise associated with a system such as system 100 of FIG. 1.

The AEM 402 includes an ADDM appliance data store 408. The AEM 402 further stores and maintains an operation-message map 430 on the ADDM appliance data store 408. The operation-message map 430 stores interface and message information 434 that are indexed by operation IDs and appliance IDs 432. For instance, in an example, an operation has an operation ID of A, and the operation is to be performed, at least in part by ADDM appliances identified by IDs B and C. By searching the operation-message map 430 using the operation ID of A and the appliance ID of B, interface(s) and message(s) are returned that are specific to the ADDM appliance identified by B, wherein the returned message(s) cause the ADDM appliance identified by B to perform at least a portion of the required sub-operations to complete the operation A.

The interface(s) and message(s) 434 include information that enable the ADDM interface 410 to communicate with the ADDM appliance 418 in a compatible way, including interface type, specific parameters that must be used, or the like. For instance, the interface(s) and message(s) 434 include an interface type value indicating that an associated message should be sent to the ADDM appliance 418 using an API 436 or a CLI 438. Further, the messages are configured to be compatible with the specific ADDM appliance 418 and interface (e.g., API 436) that is being used.

In some examples, the operation-message map 430 is populated with the interfaces and messages 434 associated with an ADDM appliance 418 during a configuration process of the AEM 402, the AEM 402 is configured to interact with the ADDM appliance 418. The methods, parameters, and other information that defines the interfaces of the ADDM appliance 418 are obtained and stored in the operation-message map 430, wherein storing that information in the operation-message map 430 includes linking the information to the ID of the ADDM appliance 418 and IDs of operations that correspond to the messages to be sent to the ADDM appliance 418.

Exemplary Operating Environment

Figure 5:
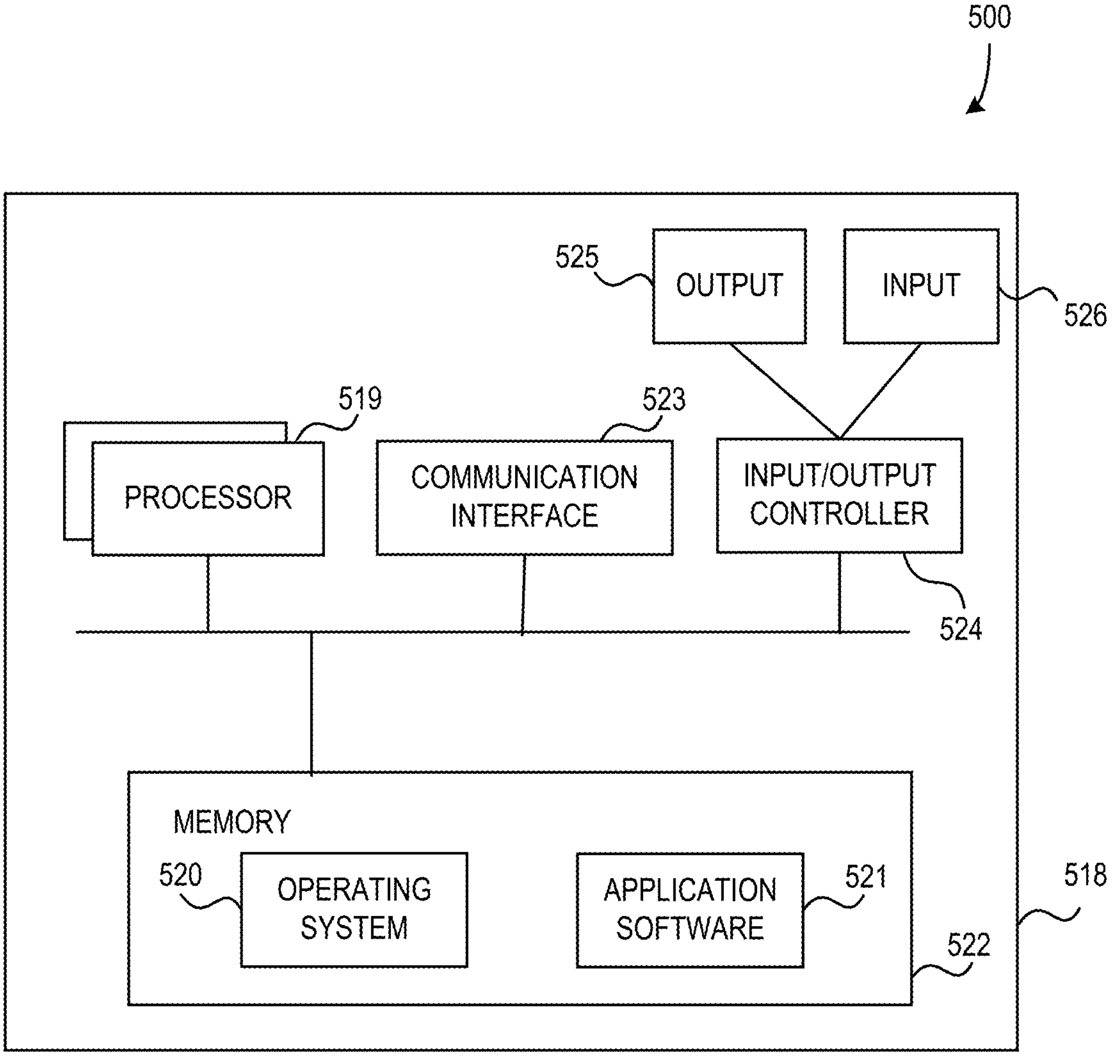
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. In some examples, platform software comprising an operating system 520 or any other suitable platform software is provided on the apparatus 518 to enable application software 521 to be executed on the device. In some examples, configuring and using an AEM 102 to synchronize and/or manage a group of different ADDM appliances 118-122 as described herein is accomplished by software, hardware, and/or firmware.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or other interface, which are separate from or integral to the electronic device. Additionally, or alternatively, the input/output controller 524 is configured to receive and process an input from one or more input devices 526, for example, a keyboard, a mouse, a microphone, or another human interface device. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to cause the processor to:

determine an operation to be performed that is associated with a first ADDM appliance and a second ADDM appliance; identify a first sub-operation of the determined operation to be performed by the first ADDM appliance; identify a second sub-operation of the determined operation to be performed by the second ADDM appliance; determine a first message to be sent to the first ADDM appliance from a group of messages in an ADDM appliance data store, wherein the first message is compatible with a first interface of the first ADDM appliance and the first message is configured to cause the first sub-operation to be performed by the first ADDM appliance; determine a second message to be sent to the second ADDM appliance from the group of messages in the ADDM appliance data store, wherein the second message is compatible with a second interface of the second ADDM appliance and the second message is configured to cause the second sub-operation to be performed by the second ADDM appliance; send the determined first message to the first ADDM appliance using the first interface, whereby the first sub-operation is performed by the first ADDM appliance; and send the determined second message to the second ADDM appliance using the second interface, whereby the second sub-operation is performed by the second ADDM appliance.

An example computerized method comprises: determining an operation to be performed that is associated with an ADDM appliance; determining a first message to be sent to the ADDM appliance from a group of messages in an ADDM appliance data store, wherein the first message is compatible with an application programming interface (API) of the ADDM appliance, and the first message is configured to cause a first sub-operation of the determined operation to be performed by the ADDM appliance; determining a second message to be sent to the ADDM appliance from a group of messages in an ADDM appliance data store, wherein the second message is compatible with a command line interface (CLI) of the ADDM appliance, and the second message is configured to cause a second sub-operation of the determined operation to be performed by the ADDM appliance; sending the determined first message to the ADDM appliance using the API, whereby the first sub-operation is performed by the ADDM appliance; and sending the determined second message to the ADDM appliance using the CLI, whereby the second sub-operation is performed by the ADDM appliance.

One or more computer storage media have computer-executable instructions that, upon execution by a processor, cause the processor to at least: determine an operation to be performed that is associated with a first ADDM appliance and a second ADDM appliance; identify a first sub-operation of the determined operation to be performed by the first ADDM appliance; identify a second sub-operation of the determined operation to be performed by the second ADDM appliance; determine a first message to be sent to the first ADDM appliance from a group of messages in an ADDM appliance data store, wherein the first message is compatible with a first interface of the first ADDM appliance and the first message is configured to cause the first sub-operation to be performed by the first ADDM appliance; determine a second message to be sent to the second ADDM appliance from the group of messages in the ADDM appliance data store, wherein the second message is compatible with a second interface of the second ADDM appliance and the second message is configured to cause the second sub-operation to be performed by the second ADDM appliance; send the determined first message to the first ADDM appliance using the first interface, whereby the first sub-operation is performed by the first ADDM appliance; and send the determined second message to the second ADDM appliance using the second interface, whereby the second sub-operation is performed by the second ADDM appliance.

Alternatively, or in addition to the other examples described herein, examples include any combination of the following:

wherein sending the determined first message to the first ADDM appliance using the first interface includes forming an intra-network connection over a first network with the first ADDM appliance over which the determined first message is sent; and wherein sending the determined second message to the second ADDM appliance using the second interface includes forming a network connection to a second network on which the second ADDM appliance is deployed, wherein the second message is sent over the network connection to the second network.

wherein the first interface is an application programming interface (API), and the second interface is a command line interface (CLI).

wherein the determined operation is an operation for updating account credentials on the first ADDM appliance and the second ADDM appliance; and wherein the determined first message includes instructions to the first ADDM appliance to update account credentials as defined by the determined operation and the second message includes instructions to the second ADDM appliance to update account credentials as defined by the determined operation, such that the updated account credentials on the first ADDM appliance and the second ADDM appliance match.

wherein the determined operation is an operation for updating account credentials on the first ADDM appliance and maintaining original account credentials on the second ADDM appliance; and wherein the determined first message includes instructions to the first ADDM appliance to update account credentials as defined by the determined operation and the second message includes instructions to the second ADDM appliance to maintain the original account credentials as defined by the determined operation, such that the updated account credentials on the first ADDM appliance and the second ADDM appliance differ and both the updated account credentials and the original account credentials are in use.

wherein the determined operation is an operation for synchronizing a first configuration of the first ADDM appliance and a second configuration of the second ADDM appliance; and wherein the determined first message includes a request for configuration information of the first configuration of the first ADDM appliance and the determined second message includes instructions to the second ADDM appliance to update the second configuration of the second ADDM appliance using the configuration information of the first configuration of the first ADDM appliance.

wherein the determined operation is an operation for addressing an issue associated with a first information technology (IT) infrastructure entity of the first ADDM appliance; wherein the determined first message includes an instruction to the first ADDM appliance to reset the first IT infrastructure entity; and wherein the determined second message includes an instruction to the second ADDM appliance to reconfigure a second IT infrastructure entity to replace the first IT infrastructure entity during downtime of the first IT infrastructure entity.

wherein the determined operation is an operation for updating account credentials on the ADDM appliance; and wherein the determined first message includes instructions to the ADDM appliance to update a first portion of account credentials as defined by the determined operation and the second message includes instructions to the ADDM appliance to update a second portion of account credentials as defined by the determined operation.

wherein the determined operation is an operation for synchronizing a first configuration of the ADDM appliance with a second configuration of another ADDM appliance; and wherein the determined first message includes instructions to update a first portion of the first configuration of the ADDM appliance using the second configuration and the determined second message includes instructions to the ADDM appliance to update a second portion of the first configuration of the ADDM appliance using the second configuration.

wherein the determined operation is an operation for addressing an issue associated with a first information technology (IT) infrastructure entity of the ADDM appliance; wherein the determined first message includes an instruction to the ADDM appliance to reset the first IT infrastructure entity; and wherein the determined second message includes an instruction to the ADDM appliance to reroute traffic associated with the first IT infrastructure entity to a second IT infrastructure entity.

wherein determining the operation to be performed that is associated with the ADDM appliance further includes displaying an icon associated with the determined operation on a first portion of a graphical user interface (GUI), wherein the first portion of the GUI is associated with pending operations; and wherein the computerized method further comprises automatically moving the icon associated with the determined operation to a second portion of the GUI associated with completed operations in response to the determined operation being completed.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for determining an operation to be performed that is associated with a first ADDM appliance and a second ADDM appliance; exemplary means for identifying a first sub-operation of the determined operation to be performed by the first ADDM appliance; exemplary means for identifying a second sub-operation of the determined operation to be performed by the second ADDM appliance; exemplary means for determining a first message to be sent to the first ADDM appliance from a group of messages in an ADDM appliance data store, wherein the first message is compatible with a first interface of the first ADDM appliance and the first message is configured to cause the first sub-operation to be performed by the first ADDM appliance; exemplary means for determining a second message to be sent to the second ADDM appliance from the group of messages in the ADDM appliance data store, wherein the second message is compatible with a second interface of the second ADDM appliance and the second message is configured to cause the second sub-operation to be performed by the second ADDM appliance; exemplary means for sending the determined first message to the first ADDM appliance using the first interface, whereby the first sub-operation is performed by the first ADDM appliance; and exemplary means for sending the determined second message to the second ADDM appliance using the second interface, whereby the second sub-operation is performed by the second ADDM appliance.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method comprising:

determining an operation to be performed that is associated with an application discovery and dependency mapping (ADDM) appliance;

determining a first message to be sent to the ADDM appliance from a group of messages in an ADDM appliance data store, wherein the first message is compatible with an application programming interface (API) of the ADDM appliance, and the first message is configured to cause a first sub-operation of the determined operation to be performed by the ADDM appliance;

determining a second message to be sent to the ADDM appliance from a group of messages in an ADDM appliance data store, wherein the second message is compatible with a command line interface (CLI) of the ADDM appliance, and the second message is configured to cause a second sub-operation of the determined operation to be performed by the ADDM appliance;

sending the determined first message to the ADDM appliance using the API, whereby the first sub-operation is performed by the ADDM appliance; and sending the determined second message to the ADDM appliance using the CLI, whereby the second sub-operation is performed by the ADDM appliance.

2. The computerized method of claim 1, wherein the determined operation is an operation for updating account credentials on the ADDM appliance; and wherein the determined first message includes instructions to the ADDM appliance to update a first portion of account credentials as defined by the determined operation and the second message includes instructions to the ADDM appliance to update a second portion of account credentials as defined by the determined operation.

3. The computerized method of claim 1, wherein the determined operation is an operation for synchronizing a first configuration of the ADDM appliance with a second configuration of another ADDM appliance; and wherein the determined first message includes instructions to update a first portion of the first configuration of the ADDM appliance using the second configuration and the determined second message includes instructions to the ADDM appliance to update a second portion of the first configuration of the ADDM appliance using the second configuration.

4. The computerized method of claim 1, wherein the determined operation is an operation for addressing an issue associated with a first information technology (IT) infrastructure entity of the ADDM appliance;

wherein the determined first message includes an instruction to the ADDM appliance to reset the first IT infrastructure entity; and wherein the determined second message includes an instruction to the ADDM appliance to reroute traffic associated with the first IT infrastructure entity to a second IT infrastructure entity.

5. The computerized method of claim 1, wherein determining the operation to be performed that is associated with the ADDM appliance further includes displaying an icon associated with the determined operation on a first portion of a graphical user interface (GUI), wherein the first portion of the GUI is associated with pending operations; and wherein the computerized method further comprises automatically moving the icon associated with the determined operation to a second portion of the GUI associated with completed operations in response to the determined operation being completed.

6. A system comprising:

a processor; and a memory comprising computer program code, the memory and the computer program code configured to cause the processor to:

determine an operation to be performed that is associated with a first application discovery and dependency mapping (ADDM) appliance and a second ADDM appliance;

identify a first sub-operation of the determined operation to be performed by the first ADDM appliance;

identify a second sub-operation of the determined operation to be performed by the second ADDM appliance;

determine a first message to be sent to the first ADDM appliance from a group of messages in an ADDM appliance data store, wherein the first message is compatible with a first interface of the first ADDM appliance and the first message is configured to cause the first sub-operation to be performed by the first ADDM appliance, wherein the first interface is an application programming interface (API);

determine a second message to be sent to the second ADDM appliance from the group of messages in the ADDM appliance data store, wherein the second message is compatible with a second interface of the second ADDM appliance and the second message is configured to cause the second sub-operation to be performed by the second ADDM appliance, wherein the second interface is a command line interface (CLI);

send the determined first message to the first ADDM appliance using the first interface, whereby the first sub-operation is performed by the first ADDM appliance; and send the determined second message to the second ADDM appliance using the second interface, whereby the second sub-operation is performed by the second ADDM appliance.

7. The system of claim 6, wherein sending the determined first message to the first ADDM appliance using the first interface includes forming an intra-network connection over a first network with the first ADDM appliance over which the determined first message is sent; and wherein sending the determined second message to the second ADDM appliance using the second interface includes forming a network connection to a second network on which the second ADDM appliance is deployed, wherein the second message is sent over the network connection to the second network.

8. The system of claim 6, wherein determining the first message and determining the second message comprise:

identifying an operation identifier associated with the determined operation;

accessing an operation-message map stored in the ADDM appliance data store, the operation-message map storing interface and message information indexed by operation identifiers and appliance identifiers; and selecting the first message and the second message from the operation-message map based on the operation identifier and identifiers of the first ADDM appliance and the second ADDM appliance.

9. The system of claim 6, wherein the determined operation is an operation for updating account credentials on the first ADDM appliance and the second ADDM appliance; and wherein the determined first message includes instructions to the first ADDM appliance to update account credentials as defined by the determined operation and the second message includes instructions to the second ADDM appliance to update account credentials as defined by the determined operation, such that the updated account credentials on the first ADDM appliance and the second ADDM appliance match.

10. The system of claim 6, wherein the determined operation is an operation for updating account credentials on the first ADDM appliance and maintaining original account credentials on the second ADDM appliance; and wherein the determined first message includes instructions to the first ADDM appliance to update account credentials as defined by the determined operation and the second message includes instructions to the second ADDM appliance to maintain the original account credentials as defined by the determined operation, such that the updated account credentials on the first ADDM appliance and the second ADDM appliance differ and both the updated account credentials and the original account credentials are in use.

11. The system of claim 6, wherein the determined operation is an operation for synchronizing a first configuration of the first ADDM appliance and a second configuration of the second ADDM appliance; and wherein the determined first message includes a request for configuration information of the first configuration of the first ADDM appliance and the determined second message includes instructions to the second ADDM appliance to update the second configuration of the second ADDM appliance using the configuration information of the first configuration of the first ADDM appliance.

12. The system of claim 6, wherein the determined operation is an operation for addressing an issue associated with a first information technology (IT) infrastructure entity of the first ADDM appliance;

wherein the determined first message includes an instruction to the first ADDM appliance to reset the first IT infrastructure entity; and wherein the determined second message includes an instruction to the second ADDM appliance to reconfigure a second IT infrastructure entity to replace the first IT infrastructure entity during downtime of the first IT infrastructure entity.

13. A computer storage medium has computer-executable instructions that, upon execution by a processor, cause the processor to at least:

determine an operation to be performed that is associated with a first application discovery and dependency mapping (ADDM) appliance and a second ADDM appliance;

identify a first sub-operation of the determined operation to be performed by the first ADDM appliance;

identify a second sub-operation of the determined operation to be performed by the second ADDM appliance;

determine a first message to be sent to the first ADDM appliance from a group of messages in an ADDM appliance data store, wherein the first message is compatible with a first interface of the first ADDM appliance and the first message is configured to cause the first sub-operation to be performed by the first ADDM appliance, wherein the first interface is an application programming interface (API);

determine a second message to be sent to the second ADDM appliance from the group of messages in the ADDM appliance data store, wherein the second message is compatible with a second interface of the second ADDM appliance and the second message is configured to cause the second sub-operation to be performed by the second ADDM appliance, wherein the second interface is a command line interface (CLI);

send the determined first message to the first ADDM appliance using the first interface, whereby the first sub-operation is performed by the first ADDM appliance; and send the determined second message to the second ADDM appliance using the second interface, whereby the second sub-operation is performed by the second ADDM appliance.

14. The computer storage medium of claim 13, wherein sending the determined first message to the first ADDM appliance using the first interface includes forming an intra-network connection over a first network with the first ADDM appliance over which the determined first message is sent; and wherein sending the determined second message to the second ADDM appliance using the second interface includes forming a network connection to a second network on which the second ADDM appliance is deployed, wherein the second message is sent over the network connection to the second network.

15. The computer storage medium of claim 13, wherein determining the first message and determining the second message comprise:

identifying an operation identifier associated with the determined operation;

accessing an operation-message map stored in the ADDM appliance data store, the operation-message map storing interface and message information indexed by operation identifiers and appliance identifiers; and selecting the first message and the second message from the operation-message map based on the operation identifier and identifiers of the first ADDM appliance and the second ADDM appliance.

16. The computer storage medium of claim 13, wherein the determined operation is an operation for updating account credentials on the first ADDM appliance and the second ADDM appliance; and wherein the determined first message includes instructions to the first ADDM appliance to update account credentials as defined by the determined operation and the second message includes instructions to the second ADDM appliance to update account credentials as defined by the determined operation, such that the updated account credentials on the first ADDM appliance and the second ADDM appliance match.

17. The computer storage medium of claim 13, wherein the determined operation is an operation for updating account credentials on the first ADDM appliance and maintaining original account credentials on the second ADDM appliance; and wherein the determined first message includes instructions to the first ADDM appliance to update account credentials as defined by the determined operation and the second message includes instructions to the second ADDM appliance to maintain the original account credentials as defined by the determined operation, such that the updated account credentials on the first ADDM appliance and the second ADDM appliance differ and both the updated account credentials and the original account credentials are in use.

18. The computer storage medium of claim 13, wherein the determined operation is an operation for synchronizing a first configuration of the first ADDM appliance and a second configuration of the second ADDM appliance; and wherein the determined first message includes a request for configuration information of the first configuration of the first ADDM appliance and the determined second message includes instructions to the second ADDM appliance to update the second configuration of the second ADDM appliance using the configuration information of the first configuration of the first ADDM appliance.

19. The computer storage medium of claim 13, wherein the determined operation is an operation for addressing an issue associated with a first information technology (IT) infrastructure entity of the first ADDM appliance;

wherein the determined first message includes an instruction to the first ADDM appliance to reset the first IT infrastructure entity; and wherein the determined second message includes an instruction to the second ADDM appliance to reconfigure a second IT infrastructure entity to replace the first IT infrastructure entity during downtime of the first IT infrastructure entity.

20. The computer storage medium of claim 13, wherein determining the operation to be performed that is associated with the first ADDM appliance and the second ADDM appliance further includes displaying an icon associated with the determined operation on a first portion of a graphical user interface (GUI), wherein the first portion of the GUI is associated with pending operations; and wherein the computer-executable instructions, upon execution by the processor, further cause the processor to at least automatically move the icon associated with the determined operation to a second portion of the GUI associated with completed operations in response to the determined operation being completed.

* * * * *